(12) United States Patent
Liu et al.

(10) Patent No.: US 11,268,622 B2
(45) Date of Patent: Mar. 8, 2022

(54) FUSIBLE FIRE-PROOF EMERGENCY CUT-OFF VALVE

(71) Applicant: JIANGSU RELIABLE MECHANICAL EQUIPMENT CO., LTD, Jiangsu (CN)

(72) Inventors: Hailiang Liu, Jiangsu (CN); Tao Mu, Jiangsu (CN); Shoujun Zhao, Jiangsu (CN); Zaixiao Zhang, Jiangsu (CN); Lei Wang, Jiangsu (CN)

(73) Assignee: JIANGSU RELIABLE MECHANICAL EQUIPMENT CO., LTD, Jiangsu (CN)

( * ) Notice: Subject to any disclaimer, the term of this patent is extended or adjusted under 35 U.S.C. 154(b) by 0 days.

(21) Appl. No.: 17/295,451

(22) PCT Filed: Sep. 9, 2019

(86) PCT No.: PCT/CN2019/104857
§ 371 (c)(1),
(2) Date: May 20, 2021

(87) PCT Pub. No.: WO2020/103534
PCT Pub. Date: May 28, 2020

(65) Prior Publication Data
US 2021/0404573 A1  Dec. 30, 2021

(30) Foreign Application Priority Data

Nov. 20, 2018 (CN) .......................... 201811381265.5
Nov. 20, 2018 (CN) .......................... 201821908802.2

(51) Int. Cl.
*F16K 17/38* (2006.01)
*F16K 31/56* (2006.01)
*F16K 1/20* (2006.01)

(52) U.S. Cl.
CPC .......... *F16K 17/386* (2013.01); *F16K 1/2007* (2013.01); *F16K 31/563* (2013.01)

(58) Field of Classification Search
CPC ....... A62C 37/11; A62C 37/12; F16K 17/003; F16K 17/38; F16K 17/383; F16K 17/386; F16K 31/563; Y10T 137/8811
(Continued)

(56) References Cited

U.S. PATENT DOCUMENTS 1,981,200 A * 11/1934 Schultz ................. F16K 17/386
137/75
3,835,875 A *  9/1974 Morse ................... F16K 17/386
137/75
(Continued)

FOREIGN PATENT DOCUMENTS

CN    206054864    3/2017
CN    107061815    8/2017
(Continued)

OTHER PUBLICATIONS

"International Search Report (Form PCT/ISA/210) of PCT/CN2019/104857," dated Nov. 27, 2019, with English translation thereof, pp. 1-6.

*Primary Examiner* — Kevin F Murphy
*Assistant Examiner* — Jonathan J Waddy
(74) *Attorney, Agent, or Firm* — JCIP Global Inc.

(57) ABSTRACT

A fusible fire-proof emergency cut-off valve is provided. Two sides of a valve body are communicated with an outlet and an inlet, respectively. The inside of the valve body is rotationally connected with a rotating shaft. A valve plate is fixed to one side of the rotating shaft and is positioned at one end of the outlet. A control mechanism comprises a shifting fork box body, one side of the shifting fork box body is connected with a second cylinder, and the other side of the shifting fork box body is connected with a first cylinder. The (Continued)

other side of the rotating shaft is inserted into the shifting fork box body and fixedly connected with a shifting fork. The inside of the second cylinder is provided with a piston rod penetrating through the shifting fork box body and the first cylinder.

5 Claims, 3 Drawing Sheets

(58) Field of Classification Search
USPC .......................................................... 137/797
See application file for complete search history.

(56) References Cited

U.S. PATENT DOCUMENTS

| | | | | |
|---|---|---|---|---|
| 3,860,024 | A * | 1/1975 | Turley | F16K 17/40 |
| | | | | 137/39 |
| 4,099,551 | A * | 7/1978 | Billington | B67D 7/36 |
| | | | | 137/38 |
| 4,635,670 | A | 1/1987 | Kilmoyer | |
| 2017/0122448 | A1 * | 5/2017 | Liu | F16K 17/406 |
| 2020/0041027 | A1 * | 2/2020 | Liu | F16K 31/1266 |

FOREIGN PATENT DOCUMENTS

| | | |
|---|---|---|
| CN | 107327607 | 11/2017 |
| CN | 107504234 | 12/2017 |
| CN | 109323030 | 2/2019 |
| CN | 209115756 | 7/2019 |
| JP | S60146983 | 8/1985 |

* cited by examiner

US 11,268,622 B2

FUSIBLE FIRE-PROOF EMERGENCY CUT-OFF VALVE

CROSS-REFERENCE TO RELATED APPLICATION

This application is a 371 application of the international PCT application serial no. PCT/CN2019/104857, filed on Sep. 9, 2019, which claims the priority benefit of China application no. 201811381265.5, filed on Nov. 20 2018, and China application no. 201821908802.2, filed on Nov. 20 2018. The entirety of each of the above-mentioned patent applications is hereby incorporated by reference herein and made a part of this specification.

TECHNICAL FIELD

The present invention relates to the technical field of valves, and in particular to a fusible fire-proof emergency cut-off valve.

DESCRIPTION OF RELATED ART

Fire disaster refers to a catastrophic combustion phenomenon where fire loses control over time or space. Among various disasters, fire disaster is one of the main disasters that threaten public safety and social development most often and most generally. Human beings can utilize and control fire, which is an important mark of progress of civilization. Therefore, the history of human beings' using fire is accompanied with their fighting against fire disasters. People continuously summarize the rules of occurrence of fire disasters while using fire, so as to reduce the occurrence of fire disasters and the harm thereof to human beings as much as possible. People need to escape safely and quickly in case of fire disasters.

It is easy for the existing fire-proof emergency cut-off valve to cut off the valve by mistake due to its complex structure, and people are somewhat troubled by this. Therefore, a fusible fire-proof emergency cut-off valve is provided.

SUMMARY

The present invention provides a fusible fire-proof emergency cut-off valve aiming at solving the problem in the background that it is easy for the existing fire-proof emergency cut-off valve to cut off the valve by mistake due to its complex structure and people are somewhat troubled by this.

In order to achieve the above purpose, the present invention provides a fusible fire-proof emergency cut-off valve, comprising a swing check valve and a control mechanism, wherein the swing check valve comprises a valve body, a rotating shaft, a valve cover and a valve plate, two sides of the valve body are communicated with an outlet and an inlet, respectively, the inside of the valve body is rotationally connected with the rotating shaft, and the valve plate is fixed to one side of the rotating shaft and is positioned at one end of the outlet; the control mechanism comprises a shifting fork box body, one side of the shifting fork box body is connected with a second cylinder, and the other side of the shifting fork box body is connected with a first cylinder; the other side of the rotating shaft is inserted into the shifting fork box body and fixedly connected with a shifting fork, one side of the shifting fork is provided with a clamping groove, the inside of the second cylinder is provided with a piston rod penetrating through the shifting fork box body and the first cylinder, a limit piston is fixed to the left side of the piston rod and is positioned inside the second cylinder, the right side of the limit piston is provided with a spring sleeved outside the piston rod, a shaft pin inserted into the clamping groove is fixed to the outside of the piston rod, and the right side of the piston rod is connected with a fusible pin penetrating through the first cylinder.

Preferably, the valve cover is fixed to the top of the valve body through bolts.

Preferably, a first hole slot penetrates through the right side of the piston rod, and a second hole slot penetrates through the outside of the first cylinder.

Preferably, the shaft pin is cylindrical.

Preferably, the outside of the valve plate is seamlessly attached to a port of the outlet.

Compared with the prior art, the present invention has the following beneficial effects: in the emergency cut-off valve, a fusible pin automatically fuses in high temperature environment of a fire disaster, which allows a spring to drive the piston rod to move so that the rotating shaft is driven to rotate and thus the outlet is blocked by the valve plate, thereby promptly cutting off the valve in emergency. The emergency cut-off valve features simple structure and low risk of cutting off the valve by mistake, and thus is suitable for large-scale popularization.

DESCRIPTION OF THE EMBODIMENTS

The technical schemes in the embodiments of the present invention will be clearly and completely described below with reference to the drawings in the embodiments of the present invention. It is apparent that the described embodiments are only some, but not all, embodiments of the invention. Based on the embodiments of the present invention, all other embodiments, obtained by those of ordinary skill in the art without making any creative effort, fall within the protection scope of the present invention.

Figure 1:
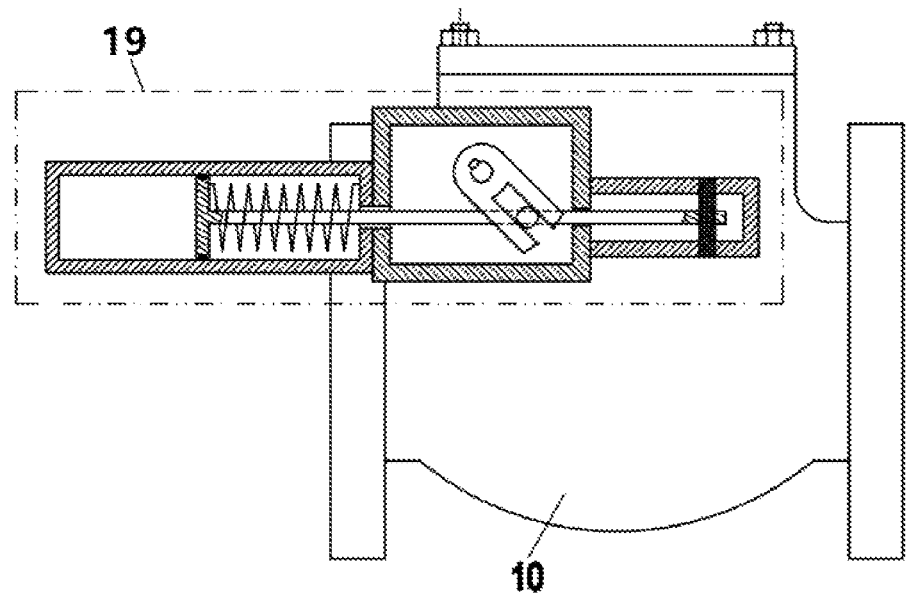
FIG. 1 is a structural schematic diagram of the fusible pin according to the present invention before fusing.
Figure 2:
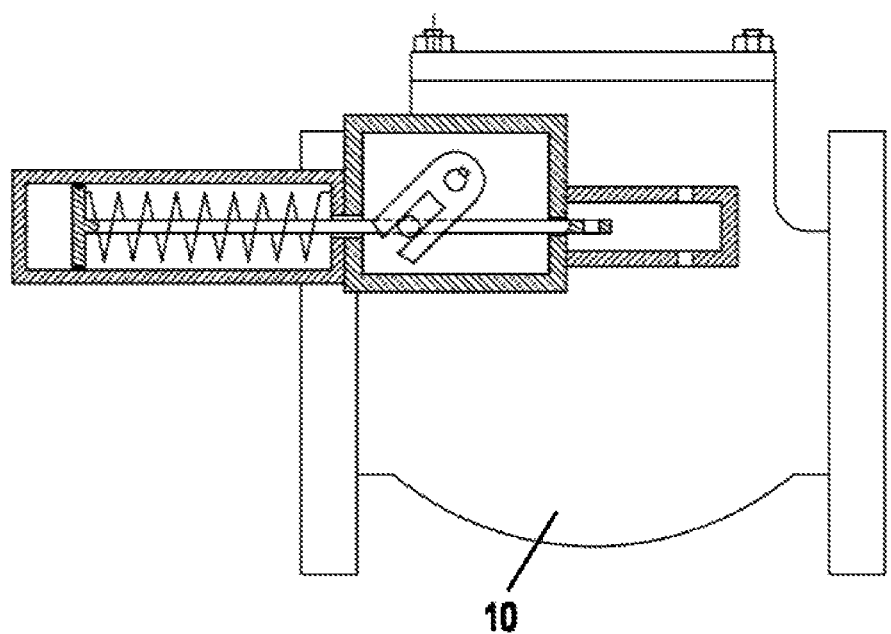
FIG. 2 is a structural schematic diagram of the fusible pin according to the present invention after fusing.
Figure 3:
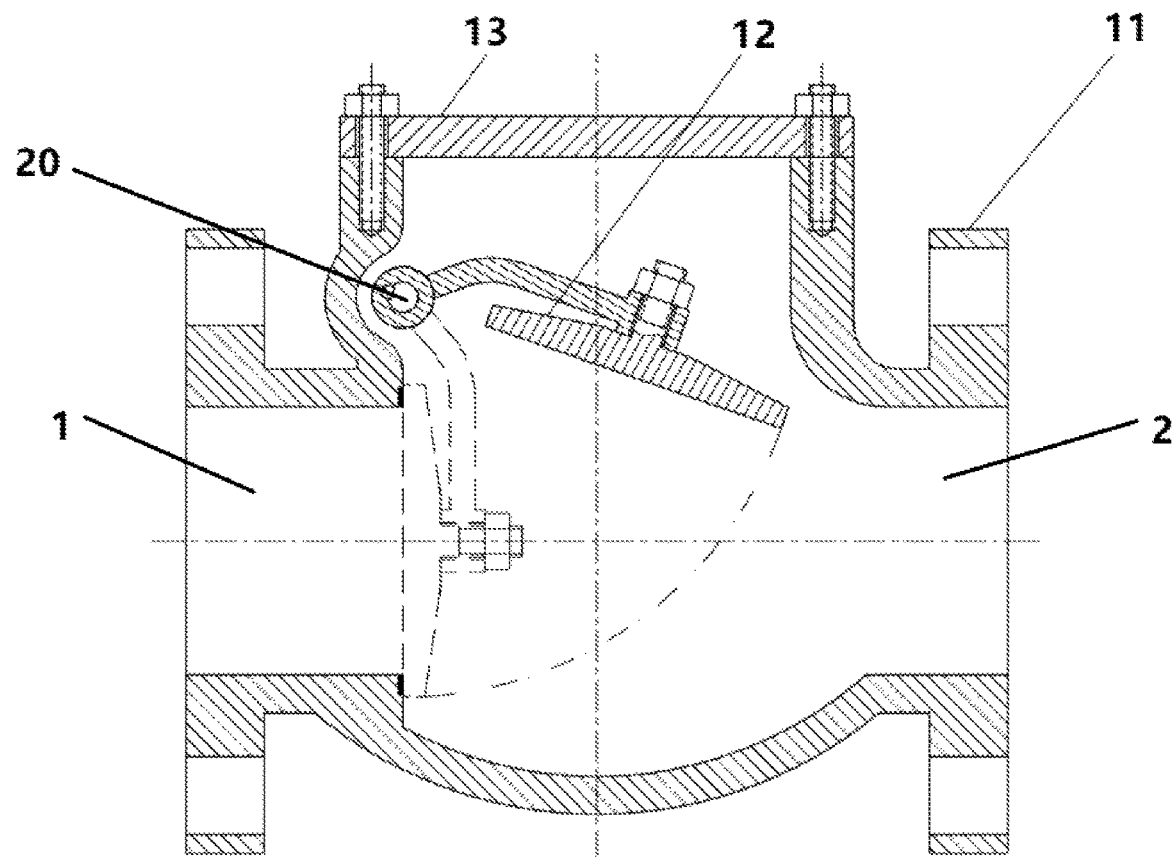
FIG. 3 is a structural schematic diagram of the valve body according to the present invention.
Figure 4:
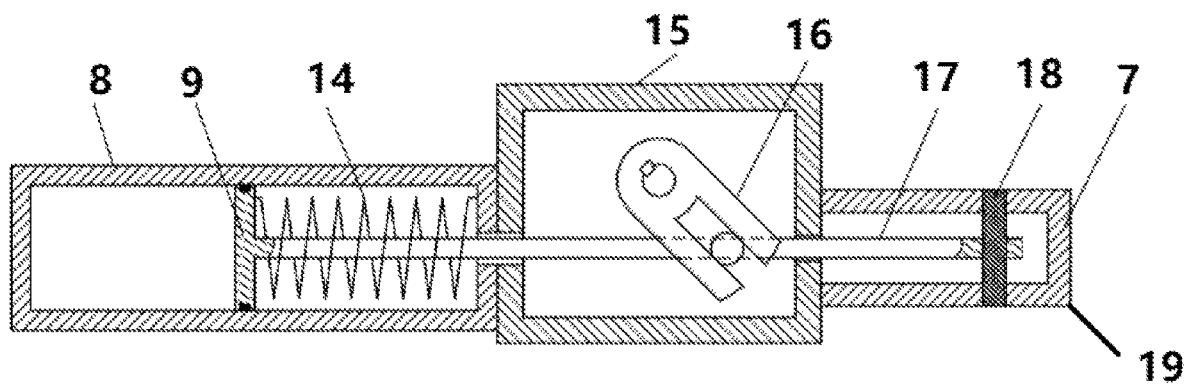
FIG. 4 is a structural schematic diagram of the control mechanism according to the present invention before running.
Figure 5:
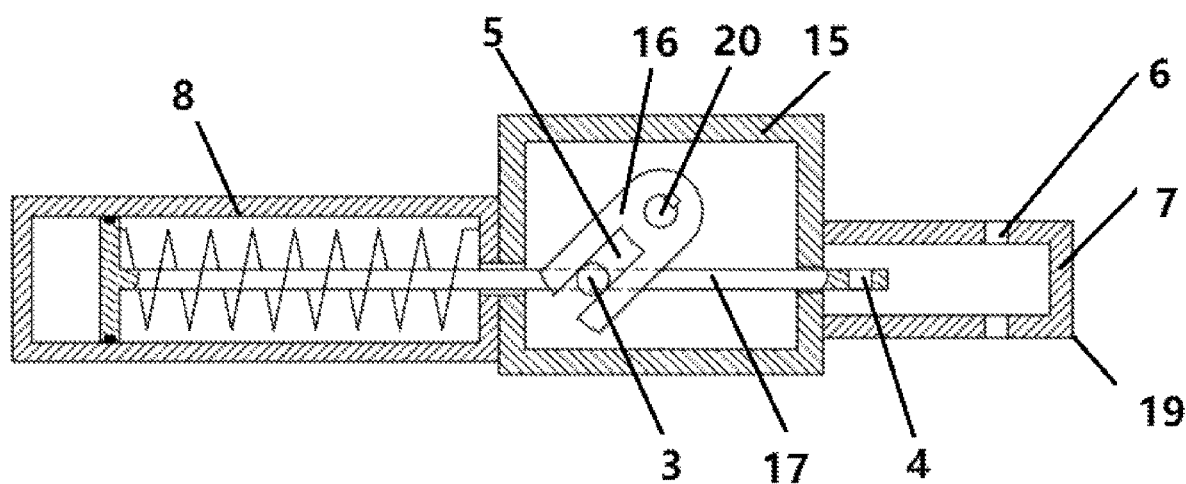
FIG. 5 is a structural schematic diagram of the control mechanism according to the present invention after running.

Referring to FIGS. 1 to 5, the present invention provides a fusible fire-proof emergency cut-off valve, comprising a swing check valve 10 and a control mechanism 19, wherein the swing check valve 10 comprises a valve body 11, a rotating shaft 20, a valve cover 13 and a valve plate 12, two sides of the valve body 11 are communicated with an outlet 1 and an inlet 2, respectively, the inside of the valve body 11 is rotationally connected with the rotating shaft 20, and the valve plate 12 is fixed to one side of the rotating shaft 20 and is positioned at one end of the outlet 1; the control mechanism 19 comprises a shifting fork box body 15, one side of the shifting fork box body 15 is connected with a second cylinder 8, and the other side of the shifting fork box body 15 is connected with a first cylinder 7; the other side of the rotating shaft 20 is inserted into the shifting fork box body 15 and fixedly connected with a shifting fork 16, one side of the shifting fork 16 is provided with a clamping groove 5, the inside of the second cylinder 8 is provided with a piston rod 17 penetrating through the shifting fork box body 15 and the first cylinder 7, a limit piston 9 is fixed to the left side of the piston rod 17 and is positioned inside the second cylinder 8, the right side of the limit piston 9 is provided with a spring 14 sleeved outside the piston rod 17, a shaft pin 3 inserted into the clamping groove 5 is fixed to the outside of the piston rod 17, and the right side of the piston rod 17 is connected with a fusible pin 18 penetrating through the first cylinder 7.

Specifically, the valve cover 13 is fixed to the top of the valve body 11 through bolts, so that it is convenient to disassemble the swing check valve 10.

Specifically, a first hole slot 4 penetrates through the right side of the piston rod 17 and a second hole slot 6 penetrates through the outside of the first cylinder 7 for fixing the fusible pin 18.

Specifically, the shaft pin 3 is cylindrical, such that the shaft pin 3 is prevented from being stuck in the clamping groove 5 and thus is allowed to smoothly drive the shifting fork 16 to rotate.

Specifically, the outside of the valve plate 12 is seamlessly attached to a port of the outlet 1, which allows the valve plate 12 to completely block the outlet 1 so as to cut off the valve.

The working principle is as follows: the fusible pin 18 may be made of a low-melting-point alloy material. The fusible pin 18 is inserted into the first hole slot 4 and the second hole slot 6 and thus the piston rod 17 is fixed after being drawn. At this point, the spring 14 is compressed, the shaft pin 3 drives the shifting fork 16 to rotate, and the shifting fork 16 drives the valve plate 12 to rotate through the rotating shaft 20, resulting in the opening of the valve plate 12 and the on-state of the outlet 1 and the inlet 2. When a fire disaster occurs, the fusible pin 18 fuses after the temperature reaches a fusing value, then the spring 14 pushes the limit piston 9 to move, the limit piston 9 drives the shaft pin 3 to move through the piston rod 17, the shaft pin 3 drives the shifting fork 16 to rotate, the rotating shifting fork 16 drives the rotating shaft 20 to rotate, and then the rotating shaft 20 drives the valve plate 12 to rotate, which results in the blocking of the outlet 1 and the off-state of the outlet 1 and the inlet 2 and thus achieves the purpose of promptly cutting off the valve in emergency.

Although embodiments of the present invention have been shown and described, it will be appreciated by those skilled in the art that various changes, modifications, substitutions and alterations can be made to these embodiments without departing from the principles and spirit of the present invention, the scope of which is defined in the appended claims and their equivalents.

What is claimed is:

1. A fusible fire-proof emergency cut-off valve, comprising a swing check valve (10) and a control mechanism (19), wherein the swing check valve (10) comprises a valve body (11), a rotating shaft (20), a valve cover (13) and a valve plate (12), two sides of the valve body (11) are communicated with an outlet (1) and an inlet (2), respectively, the inside of the valve body (11) is rotationally connected with the rotating shaft (20), and the valve plate (12) is fixed to one side of the rotating shaft (20) and is positioned at one end of the outlet (1); the control mechanism (19) comprises a shifting fork box body (15), one side of the shifting fork box body (15) is connected with a second cylinder (8), and the other side of the shifting fork box body (15) is connected with a first cylinder (7); the other side of the rotating shaft (20) is inserted into the shifting fork box body (15) and fixedly connected with a shifting fork (16), one side of the shifting fork (16) is provided with a clamping groove (5), the inside of the second cylinder (8) is provided with a piston rod (17) penetrating through the shifting fork box body (15) and the first cylinder (7), a limit piston (9) is fixed to the left side of the piston rod (17) and is positioned inside the second cylinder (8), the right side of the limit piston (9) is provided with a spring (14) sleeved outside the piston rod (17), a shaft pin (3) inserted into the clamping groove (5) is fixed to the outside of the piston rod (17), and the right side of the piston rod (17) is connected with a fusible pin (18) penetrating through the first cylinder (7).

2. The fusible fire-proof emergency cut-off valve according to claim 1, wherein the valve cover (13) is fixed to the top of the valve body (11) through bolts.

3. The fusible fire-proof emergency cut-off valve according to claim 1, wherein a first hole slot (4) penetrates through the right side of the piston rod (17), and a second hole slot (6) penetrates through the outside of the first cylinder (7).

4. The fusible fire-proof emergency cut-off valve according to claim 1, wherein the shaft pin (3) is cylindrical.

5. The fusible fire-proof emergency cut-off valve according to claim 1, wherein the outside of the valve plate (12) is seamlessly attached to a port of the outlet (1).

* * * * *